(12) United States Patent
Rajkotia

(10) Patent No.: US 7,272,120 B2
(45) Date of Patent: Sep. 18, 2007

(54) SYSTEM AND METHOD FOR DYNAMIC ALLOCATION AND SIMULTANEOUS OPERATION OF FORWARD PACKET DATA AND SUPPLEMENTAL CHANNELS IN EV-DV NETWORK

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 10/681,469

(22) Filed: Oct. 8, 2003

(65) Prior Publication Data

US 2005/0078637 A1 Apr. 14, 2005

(51) Int. Cl.
*H04Q 7/00* (2006.01)
(52) U.S. Cl. .............. 370/329; 370/342; 455/452.1
(58) Field of Classification Search ........... 370/328, 370/329, 342, 441; 455/450, 452.1, 452.2
See application file for complete search history.

(56) References Cited

U.S. PATENT DOCUMENTS

| | | | |
|---|---|---|---|
| 5,638,412 A * | 6/1997 | Blakeney et al. | 375/377 |
| 6,101,392 A * | 8/2000 | Corriveau | 455/458 |
| 6,795,411 B1 * | 9/2004 | Dino et al. | 370/329 |
| 6,996,069 B2 * | 2/2006 | Willenegger | 370/252 |
| 2004/0259578 A1 * | 12/2004 | Cherian et al. | 455/502 |
| 2005/0053023 A1 * | 3/2005 | Rajkotia et al. | 370/312 |
| 2005/0090276 A1 * | 4/2005 | Rajkotia | 455/515 |

* cited by examiner

*Primary Examiner*—Nguyen T. Vo

(57) ABSTRACT

A mobile station for use in an IS-2000-compatible wireless network. The mobile station is capable of receiving data from a first base station of the wireless network simultaneously in a first code division multiple access (CDMA) channel and a second CDMA channel. The mobile station transmits a capability message to the first base station, the capability message comprising a field indicating that the mobile station is capable of simultaneously operating in a Forward Packet Data channel (F-PDCH) and a Forward Supplemental channel (F-SCH).

21 Claims, 5 Drawing Sheets

210

| FIELD | LENGTH (BITS) |
|---|---|
| MOB_TERM | 1 |
| SLOT_CYCLE_INDEX | 3 |
| MOB_P_REV | 8 |
| SO_BITMAP_IND | 0 OR 2 |
| SO_GROUP_NUM | 0 OR 5 |
| SO_BITMAP | 0 OR 4 X (SO_BITMAP_IND) |
| SDB_DESIRED_ONLY | 0 OR 1 |
| ALT_BAND_CLASS_SUP | 0 OR 1 |
| MSG_INT_INFO_INCL | 0 OR 1 |
| SIG_INTEGRITY_SUP_INCL | 0 OR 1 |
| SIG_INTEGRITY_REQ | 0 OR 3 |
| NEW_KEY_ID | 0 OR 2 |
| NEW_SSEQ_H_INCL | 0 OR 1 |
| NEW_SSEQ_H | 0 OR 24 |
| NEW_SSEQ_H_SIG | 0 OR 8 |
| FOR_PDCH_SUPPORTED | 0 OR 1 |
| FOR_PDCH (CAPABILITY TYPE FIELDS) | 0 OR VARIABLE |
| EXT_CH_IND | 0 OR 5 |
| SIMUL_F_PDCH_SCH_SUPPORTED | 0 OR 1 |

| FIELD | LENGTH (BITS) |
|---|---|
| SYNC_ID_INCL | 0 OR 1 |
| SYNC_ID_LEN | 0 OR 4 |
| SYNC_ID | 0 OR (8 X SYNC_ID_LEN) |
| SO_BITMAP_IND | 0 OR 2 |
| SO_GROUP_NUM | 0 OR 5 |
| SO_BITMAP | 0 OR (4 X SO_BITMAP_IND) |
| ALT_BAND_CLASS_SUP | 0 OR 1 |
| MSG_INT_INFO_INCL | 0 OR 1 |
| SIG_INTEGRITY_SUP_INCL | 0 OR 1 |
| SIG_INTEGRITY_SUP | 0 OR 8 |
| SIG_INTEGRITY_REQ | 0 OR 3 |
| NEW_KEY_ID | 0 OR 2 |
| NEW_SSEQ_H_INCL | 0 OR 1 |
| NEW_SSEQ_H | 0 OR 24 |
| NEW_SSEQ_H_SIG | 0 OR 8 |
| FOR_PDCH_SUPPORTED | 0 OR 1 |
| FOR_PDCH (CAPABILITY TYPE FIELDS) | 0 OR VARIABLE |
| EXT_CH_IND | 0 OR 5 |
| SIMUL_F_PDCH_SCH_SUPPORTED | 0 OR 1 |

| FIELD | LENGTH (BITS) |
|---|---|
| OTD_SUPPORTED | 1 |
| FCH_SUPPORTED | 1 |
| FCH TYPE-SPECIFIC FIELDS | 0 OR VARIABLE |
| DCCH_SUPPORTED | 1 |
| DCCH TYPE-SPECIFIC FIELDS | 0 OR VARIABLE |
| FOR_SCH_SUPPORTED | 1 |
| FOR_SCH TYPE-SPECIFIC FIELDS | 0 OR VARIABLE |
| REV_SCH_SUPPORTED | 1 |
| REV_SCH TYPE-SPECIFIC FIELDS | 0 OR VARIABLE |
| RESERVED | 0 OR 2 |
| STS_SUPPORTED | 1 |
| 3X_CCH_SUPPORTED | 1 |
| CCSH_SUPPORTED | 0 OR 1 |
| FOR_PDCH_SUPPORTED | 0 OR 1 |
| FOR_PDCH CAPABILITY TYPE-SPECIFIC FIELDS | 0 OR VARIABLE |
| SIMUL_F_PDCH_SCH_SUPPORTED | 0 OR 1 |
| RESERVED | 0-7 (AS NEEDED) |

SYSTEM AND METHOD FOR DYNAMIC ALLOCATION AND SIMULTANEOUS OPERATION OF FORWARD PACKET DATA AND SUPPLEMENTAL CHANNELS IN EV-DV NETWORK

TECHNICAL FIELD OF THE INVENTION

The present invention relates to wireless communication systems and, more specifically, to systems and methods for dynamically allocating and simultaneously operating the Forward Packet Data channel (F-PDCH) and the Forward Supplemental channel (F-SCH) in an IS-2000 wireless network.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. The price of wireless devices has decreased to the point where these devices are affordable to nearly everyone and the price of a wireless device is only a small part of the total cost to the user (i.e., subscriber). To continue to attract new customers, wireless service providers are implementing new services, especially digital data services that, for example, enable a user to browse the Internet and to send and receive e-mail.

Earlier code division multiple access (CDMA) networks, such as IS-95 networks carried only a very small amount of data traffic. However, third generation wireless networks, such as IS-2000 (also called CDMA2000), are designed to carry much heavier loads of data traffic. IS-2000 networks are capable of efficiently providing both high-speed data services and voice traffic. Still other networks, such as 1×EV-DO networks, are primarily data systems. These types of networks, if used for both voice and data, typically carry voice on an adjacent channel to data traffic. However, IS-2000 networks (i.e., Release C of CDMA2000) carry voice and data on the same carrier.

One important feature of IS-2000 (EV-DV-Release C) networks is the use of a Forward Packet Data channel (F-PDCH) and a Forward Supplemental channel (F-SCH) that are capable of transmitting voice and data traffic from a base station to a mobile station. The F-SCH normally carries data traffic and the F-PDCH usually carries voice traffic. The F-SCH may be flexibly allocated to different subscribers, as data services are needed, thereby conserving the bandwidth resources of a base station.

An IS-2000 system allocates a high-speed data link to a mobile station by transmitting an Extended Forward Supplemental Channel Assignment message (ESCAM) to the mobile station. The ESCAM instructs the mobile station to process a particular F-SCH for a specified time period (including infinite) at a given data rate. During the assignment, the data transmitted on the F-SCH is directed only to that particular mobile station. However, a shared F-SCH may be allocated to multiple base stations in order to increase system throughput.

One significant drawback to conventional IS-2000 systems, including IS-2000C networks, and earlier wireless systems, is that a mobile station may receive data on either the F-PDCH or the F-SCH, but not both, at any given time. Simultaneous operation of the F-PDCH and the F-SCH is not possible in current wireless systems. However, the latest CDMA mobile stations use radio frequency (RF) transceivers that are capable of simultaneously receiving (and sometimes transmitting) voice traffic and data traffic on two or more CDMA channels. Thus, conventional IS-2000 systems do not take advantage of the capabilities of the latest generation of mobile stations.

Therefore, there is a need for IS-2000 wireless networks and IS-2000 mobile stations that are able to simultaneously use the Forward Packet Data channel (F-PDCH) and the Forward Supplemental channel (F-SCH). In particular, there is a need for new IS-2000 protocol messages that enable the simultaneous operation of the Forward Packet Data channel (F-PDCH) and the Forward Supplemental channel (F-SCH). More particularly, there is a need for new IS-protocol 2000 protocol messages that enable the dynamic allocation of the Forward Packet Data channel (F-PDCH) and the Forward Supplemental channel (F-SCH) to a particular mobile station.

SUMMARY OF THE INVENTION

The present invention provides an efficient mechanism and method for the simultaneous operation of the Forward Packet Data Channel (F-PDCH) and the Forward Supplemental channel (F-SCH). The present invention also provides a mechanism and method for dynamically allocating the F-PDCH and the F-SCH on a burst-by-burst basis.

To address the above-discussed deficiencies of the prior art, it is a primary object of the present invention to provide, for use in an IS-2000-compatible wireless network, a mobile station capable of receiving data from a first base station of the wireless network simultaneously in a first code division multiple access (CDMA) channel and a second CDMA channel. According to an advantageous embodiment of the present invention, the mobile station is capable of transmitting a capability message to the first base station, the capability message comprising a field indicating that the mobile station is capable of simultaneously operating in a Forward Packet Data channel (F-PDCH) and a Forward Supplemental channel (F-SCH).

According to one embodiment of the present invention, the capability message is an Origination message and the field comprises a one-bit flag indicating that the mobile station is capable of simultaneously operating in the Forward Packet Data channel and the Forward Supplemental channel.

According to another embodiment of the present invention, the capability message is a Page Response message and the field comprises a one-bit flag indicating that the mobile station is capable of simultaneously operating in the Forward Packet Data channel and the Forward Supplemental channel.

According to still another embodiment of the present invention, the mobile station transmits the Page Response message in response to a Page message received from the first base station.

According to yet another embodiment of the present invention, the capability message may be one of a Status Response message, an Extended Status Response message, and a Channel Configuration Capability Information message.

According to a further embodiment of the present invention, the Channel Configuration Capability Information message comprises a one-bit flag indicating that the mobile station is capable of simultaneously operating in the Forward Packet Data channel and the Forward Supplemental channel.

According to a still further embodiment of the present invention, the mobile station is capable of receiving a dynamic allocation message from the first base station and wherein the mobile station, in response to receipt the dynamic allocation message, is capable of receiving at least one of voice traffic and data traffic on the Forward Supplemental channel while the mobile station is receiving at least one of voice traffic and data traffic on the Forward Packet Data channel.

According to a yet further embodiment of the present invention, the mobile station is capable of receiving a dynamic allocation message from the first base station and wherein the mobile station, in response to receipt the dynamic allocation message, is capable of receiving at least one of voice traffic and data traffic on the Forward Packet Data channel while the mobile station is receiving at least one of voice traffic and data traffic on the Forward Supplemental channel.

It is another primary object of the present invention to provide, for use in an IS-2000-compatible wireless network, a base station capable of transmitting data to a mobile station simultaneously in a first code division multiple access (CDMA) channel and a second CDMA channel. According to an advantageous embodiment of the present invention, the base station is capable of receiving a capability message transmitted by the mobile station, the capability message comprising a field indicating that the mobile station is capable of simultaneously operating in a Forward Packet Data channel (F-PDCH) and a Forward Supplemental channel (F-SCH). The base station, in response to receipt of the capability message, transmits a dynamic allocation message to the mobile station. The dynamic allocation message causes the mobile station to receive at least one of voice traffic and data traffic in one of the Forward Supplemental channel and the Forward Packet Data channel while receiving at least one of voice traffic and data traffic on the other one of the Forward Supplemental channel and the Forward Packet Data channel.

The foregoing has outlined rather broadly several features of this disclosure so that those skilled in the art may better understand the Detailed Description of the Invention that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is made to the following descriptions and the accompanying drawings, wherein like numbers designate like objects, and in which:

FIG. 3 illustrates a new IS-2000 Origination message that enables the simultaneous operation and dynamic allocation of the F-PDCH and the F-SCH to a single mobile station;

FIG. 4 illustrates a new IS-2000 Page Response message that enables the simultaneous operation and dynamic allocation of the F-PDCH and the F-SCH to a single mobile station; and FIG. 5 illustrates a new IS-2000 Channel Configuration Capability Information message that enables the simultaneous operation and dynamic allocation of the Forward Packet Data channel (F-PDCH) and the Forward Supplemental channel (F-SCH) in a wireless network.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication network.

Figure 1:
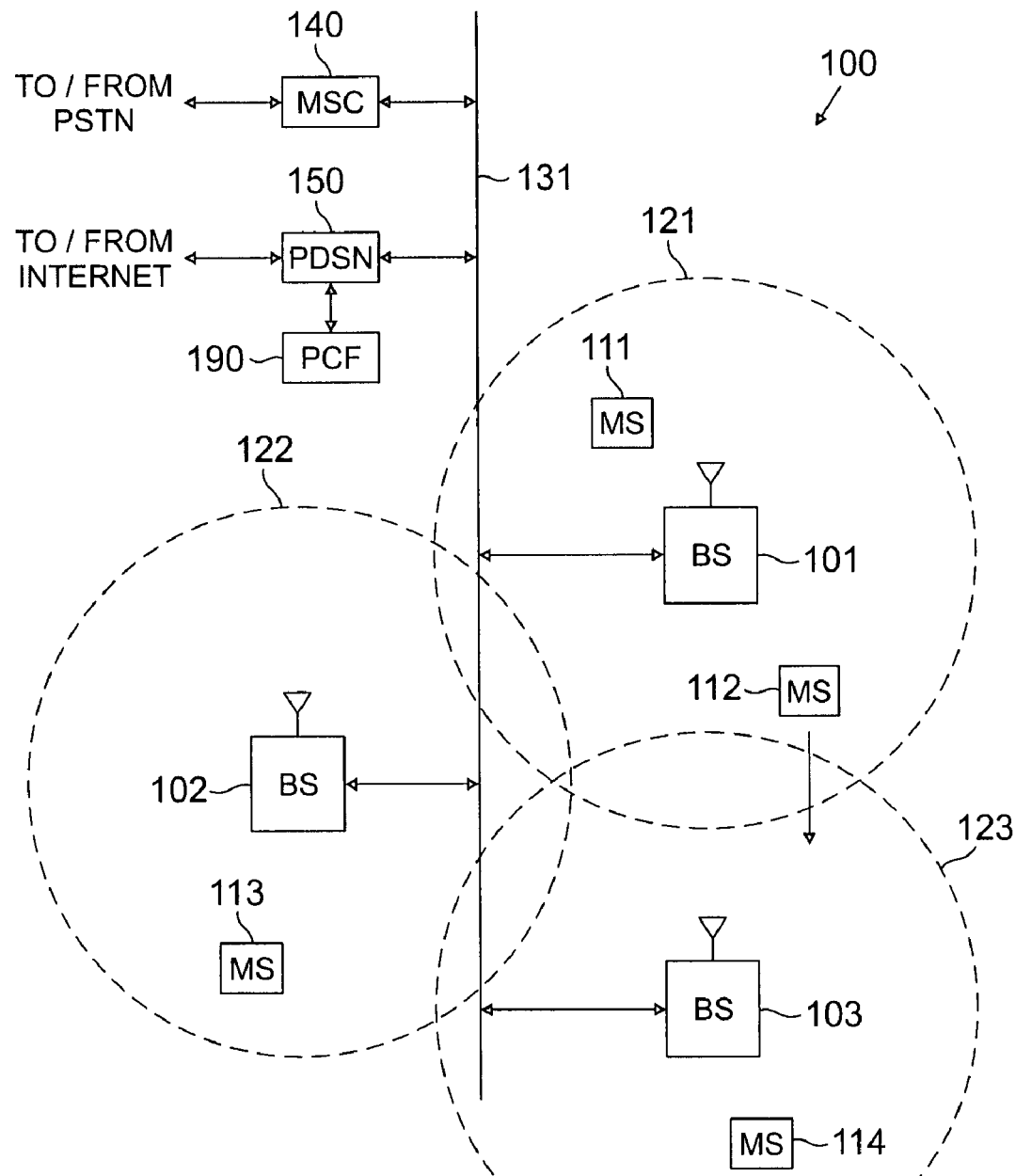
FIG. 1 illustrates a wireless network in which the Forward Packet Data channel (F-PDCH) and the Forward Supplemental channel (F-SCH) may be simultaneously operated and dynamically allocated according to the principles of the present invention.

FIG. 1 illustrates an exemplary wireless network in which the Forward Packet Data channel ((F-PDCH) and the Forward Supplemental channel (F-SCH) may be simultaneously operated and dynamically allocated to a single mobile station according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000C standard (i.e., Release C of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on is the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, the mobile stations operating in wireless network 100 are capable of receiving data traffic and/or voice traffic on two or more CDMA channels. For example, MS 111 may receive data from BS 101 using a first CDMA code and may receive data from BS 101 using a second CDMA code. In order to enable such operation, MS 111 and BS 101 must be modified according to the principles of the present invention. Advantageously, the present invention may be implemented in a conventional IS-2000 wireless network by modifying the control message software and the call stacks of both the mobile stations and the base stations. These software modifications change the operation of selected control messages that are transmitted between the mobile stations and the base stations.

Figure 2:
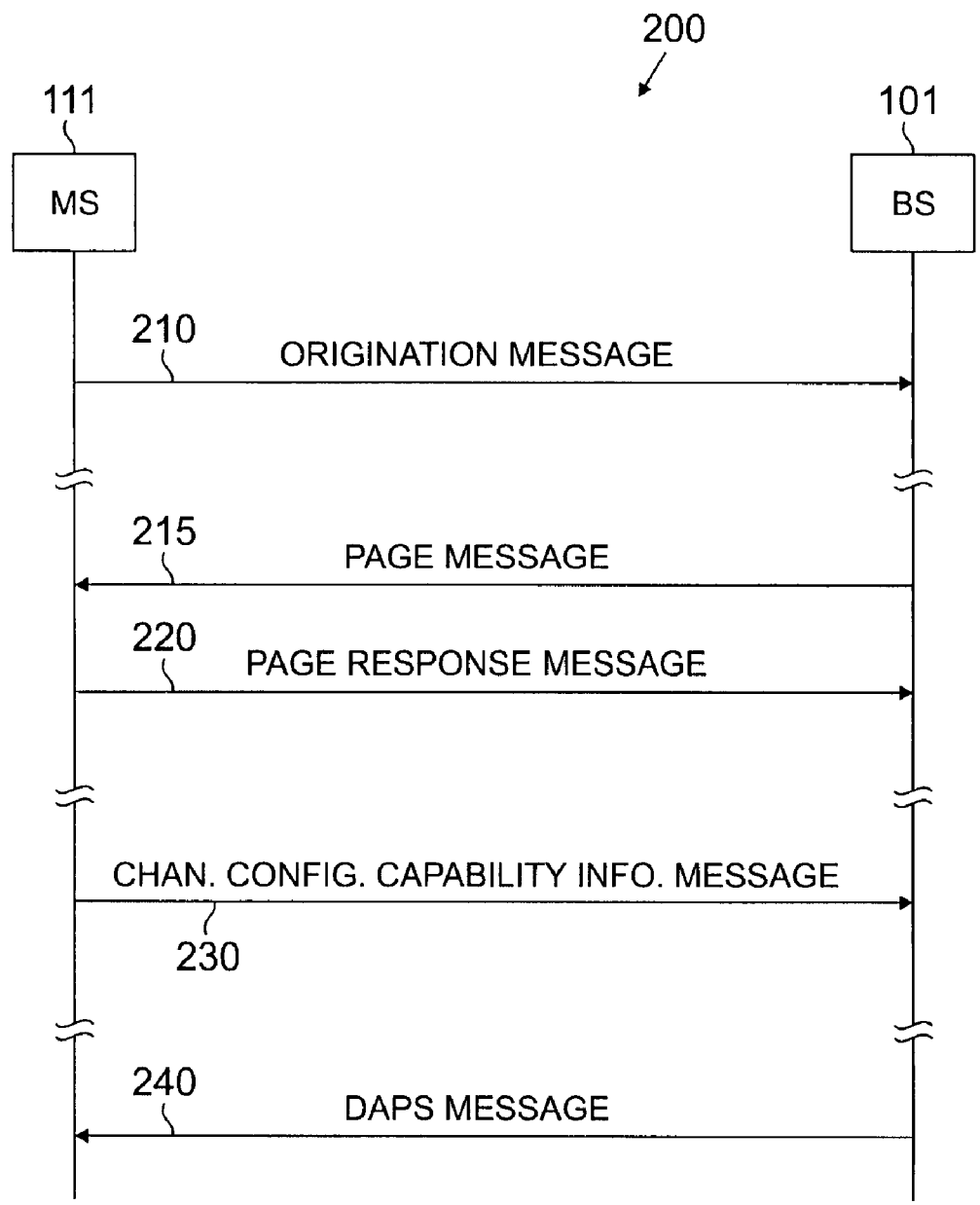
FIG. 2 is a message flow diagram illustrating selected control messages that enable the simultaneous operation and dynamic allocation of the Forward Packet Data channel (F-PDCH) and the Forward Supplemental channel (F-SCH) to a single mobile station.

FIG. 2 depicts message flow diagram 200, which illustrates selected control messages that enable the simultaneous operation and dynamic allocation of the Forward Packet Data channel (F-PDCH) and the Forward Supplemental channel (F-SCH) between mobile station (MS) 111 and base station (BS) 101 of wireless network 100. Since it is possible that not all mobile stations in wireless network 100 may be able to receive two or more CDMA channels simultaneously, it is necessary for MS 111 to inform BS 101 of the capability of MS 111 to simultaneously operate the F-PDCH and the F-SCH.

MS 111 may inform BS 111 in a number of different ways. The present invention may include an extra field (or message parameter) in Origination message 210, Page Response message 220, or Channel Configuration Capability Information message 230. In one scenario, if MS 111 initiates a call or data session with BS 101, MS 111 transmits new Origination message 210 to BS 101 that indicates that MS 111 is capable of receiving voice traffic and/or data traffic simultaneously on the Forward Packet Data channel (F-PDCH) and the Forward Supplemental channel (F-SCH). New Origination message 210 is similar in nearly all aspects to a conventional IS-2000C Origination message, except that a new message parameter has been added to hold a flag that indicates that MS 111 can receive simultaneously on the F-PDCH and the F-SCH.

FIG. 3 illustrates new IS-2000 Origination message 210, which enables the simultaneous operation and dynamic allocation of the F-PDCH and the F-SCH between mobile station (MS) 111 and base station (BS) 101 of wireless network 100. The new message parameter is the one-bit flag in SIMUL_F_PDCH_F-SCH_SUPPORTED field 305. If BS 101 determines that this flag is Logic 1, then BS 101 knows that MS 111 is capable of simultaneous operation and dynamic allocation of the F-PDCH and the F-SCH.

In another scenario, if BS 101 initiates a call or data session with MS 111, BS 101 transmits conventional Page message 215 to MS 111. MS 111 responds by transmitting new Page Response message 220 to BS 101 that indicates that MS 111 is capable of receiving voice traffic and/or data traffic simultaneously on the Forward Packet Data channel (F-PDCH) and the Forward Supplemental channel (F-SCH). New Page Response message 220 is similar in nearly all aspects to a conventional IS-2000C Page Response message, except that a new message parameter has been added to hold a flag that indicates that MS 111 can receive simultaneously on the F-PDCH and the F-SCH.

FIG. 4 illustrates new IS-2000 Page Response message 220, which enables the simultaneous operation and dynamic allocation of the F-PDCH and the F-SCH between mobile station (MS) 111 and base station (BS) 101 of wireless network 100. The new message parameter is the one-bit flag in SIMUL_F_PDCH_F-SCH_SUPPORTED field 405. If BS 101 determines that this flag is Logic 1, then BS 101 knows that MS 111 is capable of simultaneous operation and dynamic allocation of the F-PDCH and the F-SCH.

Additionally, MS 111 may indicate to BS 101 that MS 111 is capable of simultaneous operation and dynamic allocation of the F-PDCH and the F-SCH by including Channel Configuration capability information using a modified IS-2000 Status Response message or a modified IS-2000 Extended Status Response message. New Status Response (or Channel Configuration) message 210 is similar in nearly all aspects to a conventional IS-2000C Status Response message, except that a new message parameter has been added to hold a flag that indicates that MS 111 can receive simultaneously on the F-PDCH and the F-SCH.

FIG. 5 illustrates new IS-2000 Channel Configuration Capability Information message 230, which enables the simultaneous operation and dynamic allocation of the Forward Packet Data channel (F-PDCH) and the Forward Supplemental (F-SCH) between mobile station (MS) 111 and base station (BS) 101 of wireless network 100. The new message parameter is the one-bit flag in SIMUL_F_PDCH_F-SCH_SUPPORTED field 505. If BS 101 determines that this flag is Logic 1, then BS 101 knows that MS 111 is capable of simultaneous operation and dynamic allocation of the F-PDCH and the F-SCH.

If MS 111 uses any of the foregoing new messages to indicate to BS 101 that MS 111 supports the simultaneous operation of F-SCH and F-PDCH, then the scheduling algorithm (implementation dependent) in base station 101 take this information into consideration when allocating data on the traffic channels. In a typical deployment scenario, there are F-SCH users and F-PDCH users and all users are guaranteed a minimum data rate of X bits per second. The available CDMA channels are used to that level so that even if no CDMA channel by itself can guarantee a data rate of X to a subscriber, the total throughput of all CDMA channels can.

If a new mobile station that supports simultaneous F-PDCH and F-SCH operation and is guaranteed X data rate enters the cell site, that new mobile station may be accommodated by the existing PDCH and F-SCH. No newer channels have to be allocated. This saves the resources required to set up a channel for only a single mobile station. This is advantageous because even setting up the channel might impact the mobile stations on other channels (depending on the resource availability).

Currently, the IS-2000C standard does not have a means to dynamically allocate the F-PDCH and the F-SCH on a burst-by-burst basis. The present invention provides a new message for the dynamic allocation of the F-PDCH and the F-SCH. This new message is the Dynamic Allocation of F-PDCH and F-SCH (DAPS) message. The DAPS message is sent on the traffic and control channels.

By way of example, mobile station (MS) 111 is operating on the Forward Packet Data Channel (F-PDCH) and, for any one of a number of reasons, MS 111 notifies BS 101 that MS 111 wants to switch over to operate on the Forward Supplemental channel (F-SCH). To accomplish this, BS 101 sends the new DAPS message on the Forward Packet Data Channel (F-PDCH) to MS 111. MS 111 processes the DAPS message and then transitions to the F-SCH. The time during which MS 111 must transition is specified in the new message. After the transition, MS 111 may send an Acknowledgment message to base station 101 on the F-SCH, regarding its successful operation.

Similarly, if mobile station is operating on the F-SCH and decides to transition to the F-PDCH, or if BS 101 determines that MS 111 should (or must) transition to the F-PDCH, then BS 101 sends the new DAPS message to MS 111. In response, MS 111 performs the transition during the specified period. BS 111 may then transmit an Acknowledgment message on the F-PDCH. It is noted that the new DAPS message may be split in two different messages: a first DAPS message for allocating (adding or removing) the F-PDCH and a second DAPS message for allocating (adding or removing) the F-SCH.

Although the present invention has been described in detail, those skilled in the art should understand that they may make various changes, substitutions and alterations herein without departing from the spirit and scope of the invention in its broadest form.

What is claimed is:

1. For use in an IS-2000-compatible wireless network, a mobile station capable of receiving data from a first base station of said wireless network simultaneously in a first code division multiple access (CDMA) channel and a second CDMA channel, wherein said mobile station is capable of transmitting a capability message to said first base station, said capability message comprising a field indicating that said mobile station is capable of simultaneously operating in a Forward Packet Data channel (F-PDCH) and a Forward Supplemental channel (F-SCH).

2. The mobile station as set forth in claim 1, wherein said capability message is an Origination message and said field comprises a one-bit flag indicating that said mobile station is capable of simultaneously operating in said Forward Packet Data channel and said Forward Supplemental channel.

3. The mobile station as set forth in claim 1, wherein said capability message is a Page Response message and said field comprises a one-bit flag indicating that said mobile station is capable of simultaneously operating in said Forward Packet Data channel and said Forward Supplemental channel.

4. The mobile station as set forth in claim 3, wherein said mobile station transmits said Page Response message in response to a Page message received from said first base station.

5. The mobile station as set forth in claim 1, wherein said capability message is one of a Status Response message, an Extended Status Response message, and a Channel Configuration Capability Information message.

6. The mobile station as set forth in claim 5, wherein said Channel Configuration Capability Information message comprises a one-bit flag indicating that said mobile station is capable of simultaneously operating in said Forward Packet Data channel and said Forward Supplemental channel.

7. The mobile station as set forth in claim 1, wherein said mobile station is capable of receiving a dynamic allocation message from said first base station and wherein said mobile station, in response to receipt said dynamic allocation message, is capable of receiving at least one of voice traffic and data traffic on said Forward Supplemental channel while said mobile station is receiving at least one of voice traffic and data traffic on said Forward Packet Data channel.

8. The mobile station as set forth in claim 1, wherein said mobile station is capable of receiving a dynamic allocation message from said first base station and wherein said mobile station, in response to receipt said dynamic allocation message, is capable of receiving at least one of voice traffic and data traffic on said Forward Packet Data channel while said mobile station is receiving at least one of voice traffic and data traffic on said Forward Supplemental channel.

9. For use in an IS-2000-compatible wireless network, a base station capable of transmitting data to a mobile station simultaneously in a first code division multiple access (CDMA) channel and a second CDMA channel, wherein said base station is capable of receiving a capability message transmitted by said mobile station, said capability message comprising a field indicating that said mobile station is capable of simultaneously operating in a Forward Packet Data channel (F-PDCH) and a Forward Supplemental channel (F-SCH), and wherein said base station, in response to receipt of said capability message, transmits a dynamic allocation message to said mobile station, said dynamic allocation message causing said mobile station to receive at least one of voice traffic and data traffic in one of said Forward Supplemental channel and said Forward Packet Data channel while receiving at least one of voice traffic and data traffic on the other one of said Forward Supplemental channel and said Forward Packet Data channel.

10. The base station as set forth in claim 9, wherein said capability message is an Origination message and said field comprises a one-bit flag indicating that said mobile station is capable of simultaneously operating in said Forward Packet Data channel and said Forward Supplemental channel.

11. The base station as set forth in claim 9, wherein said capability message is a Page Response message and said field comprises a one-bit flag indicating that said mobile station is capable of simultaneously operating in said Forward Packet Data channel and said Forward Supplemental channel.

12. The base station as set forth in claim 11, wherein said base station transmits a Page message to cause said mobile station to transmit said Page Response message.

13. The base station as set forth in claim 9, wherein said capability message is one of a Status Response message and an Extended Status Response message containing channel configuration capability information about said mobile station.

14. The base station as set forth in claim 13, wherein said channel configuration capability information comprises a one-bit flag indicating that said mobile station is capable of simultaneously operating in said Forward Packet Data channel and said Forward Supplemental channel.

15. An IS-2000-compatible wireless network comprising a plurality of base stations, each of said plurality of base station capable of transmitting data to a mobile station simultaneously in a first code division multiple access (CDMA) channel and a second CDMA channel, wherein said each base station is capable of receiving a capability message transmitted by said mobile station, said capability message comprising a field indicating that said mobile station is capable of simultaneously operating in a Forward Packet Data channel (F-PDCH) and a Forward Supplemental channel (F-SCH), and wherein said each base station, in response to receipt of said capability message, transmits a dynamic allocation message to said mobile station, said dynamic allocation message causing said mobile station to receive at least one of voice traffic and data traffic in one of said Forward Supplemental channel and said Forward Packet Data channel while receiving at least one of voice traffic and data traffic on the other one of said Forward Supplemental channel and said Forward Packet Data channel.

16. The IS-2000-compatible wireless network as set forth in claim 15, wherein said capability message is an Origination message and said field comprises a one-bit flag indicating that said mobile station is capable of simultaneously operating in said Forward Packet Data channel and said Forward Supplemental channel.

17. The IS-2000-compatible wireless network as set forth in claim 15, wherein said capability message is a Page Response message and said field comprises a one-bit flag indicating that said mobile station is capable of simultaneously operating in said Forward Packet Data channel and said Forward Supplemental channel.

18. The IS-2000-compatible wireless network as set forth in claim 17, wherein said each base station transmits a Page message to cause said mobile station to transmit said Page Response message.

19. The IS-2000-compatible wireless network as set forth in claim 15, wherein said capability message is one of a Status Response message and an Extended Status Response message containing channel configuration capability information about said mobile station.

20. The IS-2000-compatible wireless network as set forth in claim 19, wherein said channel configuration capability information comprises a one-bit flag indicating that said mobile station is capable of simultaneously operating in said Forward Packet Data channel and said Forward Supplemental channel.

21. For use in a base station of an IS-2000-compatible wireless network, a method of transmitting data to a mobile station simultaneously in a first code division multiple access (CDMA) channel and a second CDMA channel, the method comprising the steps of:
    receiving a capability message transmitted by the mobile station, the capability message comprising a field indicating that the mobile station is capable of simultaneously operating in a Forward Packet Data channel (F-PDCH) and a Forward Supplemental channel (F-SCH);
    in response to receipt of the capability message, transmitting a dynamic allocation message to the mobile station, the dynamic allocation message causing the mobile station to receive at least one of voice traffic and data traffic in one of the Forward Supplemental channel and the Forward Packet Data channel while receiving at least one of voice traffic and data traffic on the other one of the Forward Supplemental channel and the Forward Packet Data channel.

* * * * *